US009356841B1

(12) United States Patent  (10) Patent No.: US 9,356,841 B1
Balazs et al.  (45) Date of Patent: May 31, 2016

(54) DEFERRED ACCOUNT RECONCILIATION DURING SERVICE ENROLLMENT

(71) Applicant: INTUIT INC., Mountain View, CA (US)

(72) Inventors: Alex G. Balazs, San Diego, CA (US); Larry D. Vernec, Encinitas, CA (US); Xiaoyan Cindy Liu Barker, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 347 days.

(21) Appl. No.: 13/756,233

(22) Filed: Jan. 31, 2013

(51) Int. Cl.
*H04L 12/24* (2006.01)
*G06F 17/24* (2006.01)

(52) U.S. Cl.
CPC .......... *H04L 41/5041* (2013.01); *G06F 17/243* (2013.01)

(58) Field of Classification Search
CPC ...................................................... G06F 17/30
See application file for complete search history.

(56) References Cited

U.S. PATENT DOCUMENTS

| | | | | |
|---|---|---|---|---|
| 6,192,380 B1 * | 2/2001 | Light | ................... | G06F 17/243 707/999.009 |
| 6,199,079 B1 * | 3/2001 | Gupta | ................. | G06F 17/2247 707/999.006 |
| 6,490,601 B1 * | 12/2002 | Markus | ................. | G06F 17/243 705/80 |
| 6,662,340 B2 * | 12/2003 | Rawat | ................... | G06F 17/243 705/34 |
| 7,155,614 B2 * | 12/2006 | Ellmore | ............... | G06Q 20/108 705/42 |
| 8,701,014 B1 * | 4/2014 | Schlegel | ................. | H04L 51/22 715/741 |
| RE45,371 E * | 2/2015 | Simons | ......................... | 715/224 |
| 2001/0034720 A1 * | 10/2001 | Armes | ................... | G06Q 10/04 705/65 |
| 2002/0111888 A1 * | 8/2002 | Stanley | .................. | G06Q 40/02 705/31 |
| 2004/0068693 A1 * | 4/2004 | Rawat | .................... | G06F 17/243 715/226 |
| 2005/0144090 A1 * | 6/2005 | Gadamsetty | ....... | G06Q 30/0603 705/26.1 |
| 2006/0059434 A1 * | 3/2006 | Boss | ........................ | G06F 21/46 715/780 |
| 2006/0229902 A1 * | 10/2006 | McGovern | ............. | G06Q 10/06 705/321 |
| 2007/0288502 A1 * | 12/2007 | Silverthorne | ..... | G06F 17/30241 |
| 2009/0259588 A1 * | 10/2009 | Lindsay | .................. | G06F 21/31 705/40 |
| 2009/0276839 A1 * | 11/2009 | Peneder | .................. | G06F 21/40 726/8 |
| 2009/0279682 A1 * | 11/2009 | Strandell | ................. | H04L 63/18 379/201.02 |

(Continued)

*Primary Examiner* — Backhean Tiv
(74) *Attorney, Agent, or Firm* — Patterson + Sheridan, LLP

(57) ABSTRACT

A technique for enrolling an individual for a service is described. During this enrollment technique, a match between an identifier provided by and associated with the individual is determined with an existing identifier associated with another service. If there is a correspondence between the service and the other service, enrollment information from the other service is used in an enrollment process for the service, which allows a subset of the enrollment process to be performed. Otherwise, the full enrollment process for the service is performed. In this case, reconciliation of the identifier and the existing identifier (for example, asking the individual if they also use the other service) is delayed until after the enrollment process is completed.

20 Claims, 4 Drawing Sheets

(56) References Cited

U.S. PATENT DOCUMENTS

| | | | |
|---|---|---|---|
| 2011/0287739 A1* | 11/2011 | Cajigas Bringas | H04L 63/18 455/410 |
| 2013/0031145 A1* | 1/2013 | Luo | G06F 17/30876 707/812 |
| 2013/0066987 A1* | 3/2013 | Levinson | G06Q 10/10 709/206 |
| 2013/0091171 A1* | 4/2013 | Lee | G06F 21/41 707/784 |
| 2013/0282592 A1* | 10/2013 | Zambrana | G06Q 30/012 705/302 |
| 2013/0298215 A1* | 11/2013 | Kuznetsov | H04L 9/3263 726/8 |
| 2014/0075014 A1* | 3/2014 | Chourey | G06Q 30/02 709/224 |
| 2014/0081951 A1* | 3/2014 | Greenspan | H04L 63/102 707/722 |
| 2014/0143228 A1* | 5/2014 | Blue | G06F 17/30867 707/709 |
| 2014/0149263 A1* | 5/2014 | Denton | G06F 17/243 705/27.1 |
| 2014/0157390 A1* | 6/2014 | Lurey | G06F 21/123 726/7 |
| 2014/0173709 A1* | 6/2014 | Eldar | H04L 9/3226 726/7 |
| 2014/0258243 A1* | 9/2014 | Bell | H04L 67/306 707/690 |
| 2015/0170241 A1* | 6/2015 | Jacobsen | G06F 17/243 705/26.41 |

* cited by examiner

DEFERRED ACCOUNT RECONCILIATION DURING SERVICE ENROLLMENT

BACKGROUND

The present disclosure relates to a technique for streamlining an enrollment process for a new user of a service based on a correspondence between the service and another service for which the user is already enrolled.

Acquiring prospective customers for a service (such as an online service) and converting them into paying customers is often referred to as the 'customer funnel' because there is often a steady attrition as the prospective customers navigate through the associated enrollment process. For example, an enrollment process may alienate the prospective customers by requiring that they: provide too much information in a complicated form; specify a username and password; and/or recall login information for an existing account with a provider of the online service. As a consequence, simplifying and improving the user experience during the enrollment process to increase the resulting number of paying customers is important in increasing the revenue of a provider of the service. Nonetheless, existing enrollment processes often still have a high attrition rate, which adversely impacts the provider of the service.

SUMMARY

The disclosed embodiments relate to a computer system that facilitates enrollment of an individual with a service. During operation, the computer system receives an enrollment request for the service, which includes an identifier associated with the individual. Then, the computer system identifies a match between the identifier and an existing identifier associated with another service. If the computer system determines a correspondence between the service and the other service, the computer system uses enrollment information from the other service in an enrollment process for the service, which allows a subset of the enrollment process to be performed (i.e., the enrollment process is simplified). Otherwise, if the computer system determines that there is not a correspondence between the service and the other service, the computer system performs the enrollment process for the service (i.e., the enrollment process is not simplified).

Note that the identifier may include: a username of the individual; an email address of the individual; a numerical identifier associated with the individual (such as an account number), a company associated with the individual, information in a profile of the individual, etc.

Furthermore, the correspondence between the service and the other service may include: a match between more than a predetermined percentage of enrollment information for the service and the enrollment information for the other service; and/or a predefined association of the service and the other service based on a common type of service.

In some embodiments, before using the enrollment information from the other service in the enrollment process for the service, the computer system optionally requests and/or receives confirmation (for example, from the individual) that the existing identifier is also associated with the individual. Otherwise, after performing the enrollment process for the service, the computer system may optionally request and/or receive the confirmation that the existing identifier is also associated with the individual.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for enrolling an individual for a service, and a computer-program product (e.g., software) for use with the computer system are described. During this enrollment technique, a match between an identifier provided by and associated with the individual is determined with an existing identifier associated with another service. If there is a correspondence between the service and the other service, enrollment information from the other service is used in an enrollment process for the service, which allows a subset of the enrollment process to be performed. Otherwise, the full enrollment process for the service is performed. In this case, reconciliation of the identifier and the existing identifier (for example, asking the individual if they also use the other service) is delayed until after the enrollment process is completed.

By simplifying the enrollment process when it is appropriate, and by delaying reconciliation of multiple accounts for different services with common identifiers until after the enrollment process when possible, the enrollment technique may improve the user experience when enrolling for the service. In this way, the enrollment technique may increase the number of users who enroll for the service and become paying customers (i.e., the enrollment technique may reduce attrition in the customer funnel). Thus, the enrollment technique may help increase the revenue of a provider of the service.

In the discussion that follows, a user may include: an individual or a person (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
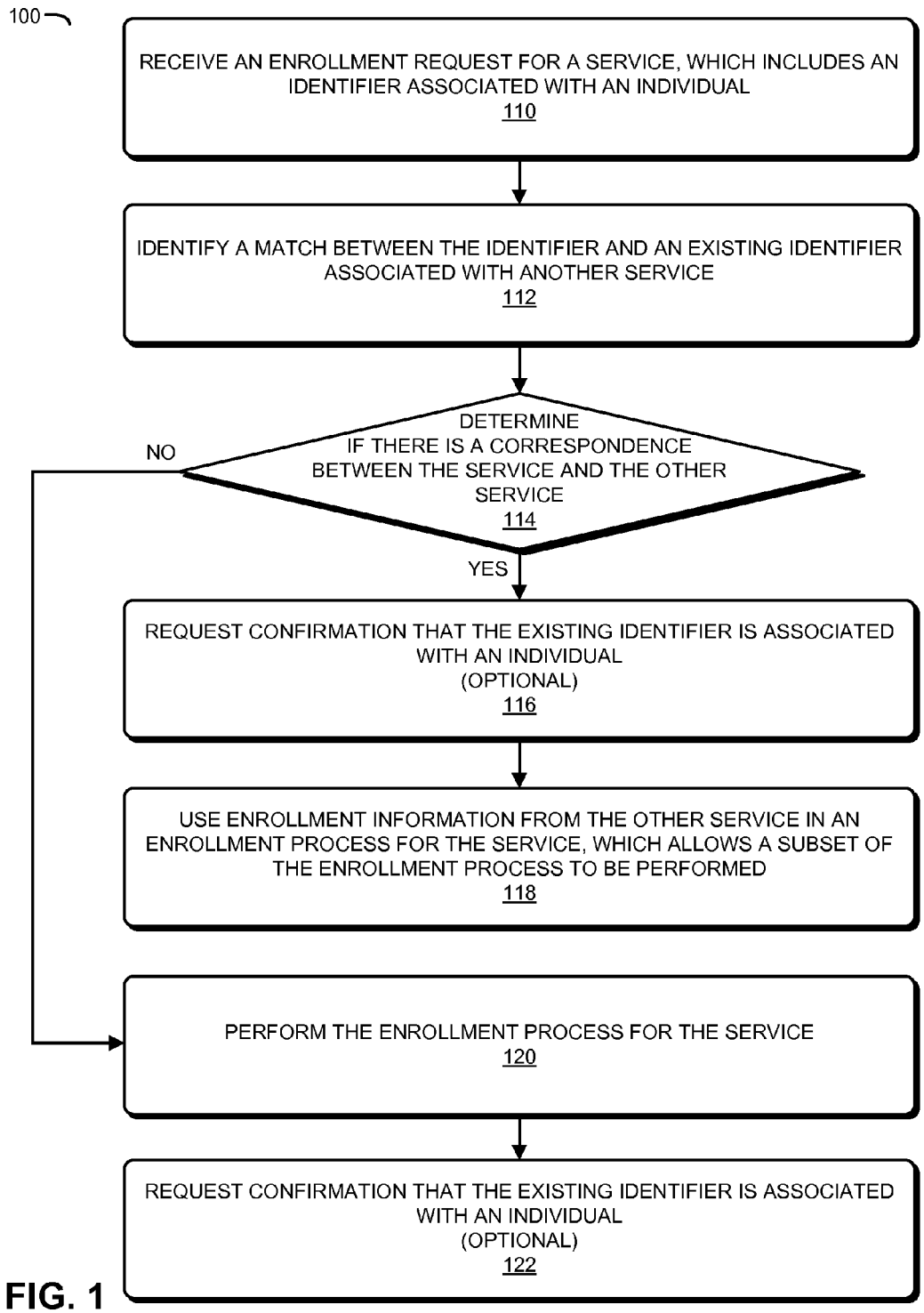
FIG. 1 is a flow chart illustrating a method for enrolling an individual for a service in accordance with an embodiment of the present disclosure.

We now describe embodiments of the enrollment technique. FIG. 1 presents a flow chart illustrating a method 100 for enrolling an individual for a service, which may be performed by a computer system (such as computer system 400 in FIG. 4). During operation, the computer system receives an enrollment request for the service, which includes an identifier associated with the individual (operation 110). For example, the enrollment request may include when the individual, such as a prospective customer of the service, accesses a web page or a website associated with the service. Note that the identifier may include: a username of the individual; an email address of the individual; a numerical identifier associated with the individual (such as an account number), a company associated with the individual, information in a profile of the individual, etc. Alternatively, a unique hardware and/or software configuration of an electronic device of the individual (including software that is installed on the electronic device or used by the individual) or a cookie stored on the electronic device may be used as the identifier. Therefore, the identifier may be directly provided by the individual or may be indirectly inferred.

Then, the computer system identifies a match between the identifier and an existing identifier associated with another service (operation 112). For example, the identifier and the existing identifier may be the same, or fewer than a predefined number of characters or symbols may be different (such as fewer than three or 10% of the characters or symbols).

If the computer system determines a correspondence between the service and the other service (operation 114), the computer system uses enrollment information from the other service in an enrollment process for the service, which allows a subset of the enrollment process to be performed (operation 118). For example, the correspondence between the service and the other service may include: a match between more than a predetermined percentage (such as 50, 60, 70 or 80%) of enrollment information for the service and the enrollment information for the other service; and/or a predefined association of the service and the other service based on a common type of service (such as types of income-tax preparation programs or accounting software). More generally, the correspondence may involve an 'overlap' in the information associated with the service and the other service, such as the information input to or output from the service and the other service. As an illustration of such overlap, the enrollment information for the service may include: a business name, an email address, a business address, a business telephone number, a contact name, a business category, bank information, and the last four digits of a Social Security number. Moreover, the enrollment information for the other service may include: a business name, an email address of an employee, a business address of the employee, a business telephone number of the employee, a contact name (such as the name of the employee), employee pay types and amounts, deductions or garnishments, pay frequency and pay dates. All but the last four items in the enrollment information for the other service may overlap with the enrollment information for the service.

Otherwise, if the computer system determines that there is not a correspondence between the service and the other service (operation 114), the computer system performs the enrollment process for the service (operation 120).

Note that determining the correspondence may involve accessing predetermined or pre-define information, such as type of services associated with the service and the existing service, or the identifier and the existing identifier.

In some embodiments, before using the enrollment information from the other service in the enrollment process for the service (operation 118), the computer system optionally requests (and/or subsequently receives) confirmation that the existing identifier is also associated with the individual (operation 116). For example, the individual may provide the confirmation. Otherwise, after performing the enrollment process for the service (operation 120), the computer system may optionally request (and/or receive) the confirmation that the existing identifier is also associated with the individual (operation 122). Thus, in this later case, the reconciliation may be deferred.

In an exemplary embodiment, the enrollment technique is implemented using an electronic device (such as a computer or a portable electronic device, e.g., a cellular telephone), and at least one server, which communicate through a network, such as a cellular-telephone network and/or the Internet (e.g., using a client-server architecture). This is illustrated in FIG. 2, which presents a flow chart illustrating method 100 (FIG. 1).

During the method, a user of electronic device 210 may provide the enrollment request and the identifier (operation 214), which may be received (operation 216) by server 212. Then, server 212 may identify a match (operation 218) between the identifier and the existing identifier. Moreover, server 212 may determine if there is a correspondence (operation 220) between the service and the other service.

Figure 2:
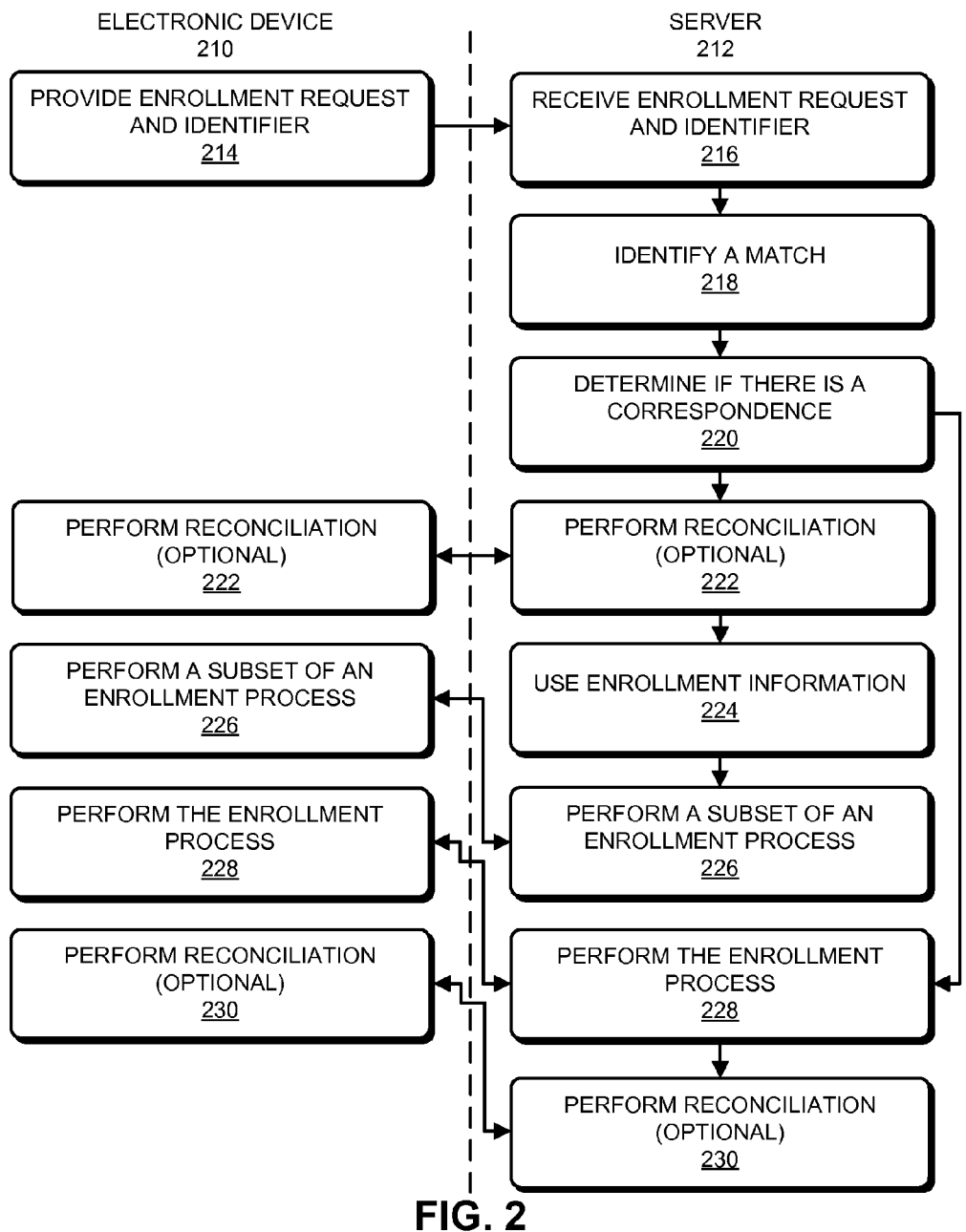
FIG. 2 is a flow chart illustrating the method of FIG. 1 in accordance with an embodiment of the present disclosure.

Based on the result of operation 220, there are two possible paths in method 100 in FIG. 2. If there is a correspondence, server 212 may optionally perform reconciliation (operation 222) with electronic device 210 to confirm that the user is also associated with the existing identifier (i.e., that the user already has an account for the other service). Then, server 212 may use the enrollment information (operation 224) from the other service in an enrollment process for the service, and server 212 may perform a subset of the enrollment process (operation 226) with electronic device 210. For example, server 212 may only ask a subset of the enrollment questions or may only present a subset of the forms or fields to the user.

Otherwise, server 212 may perform the full enrollment process (operation 228) with electronic device 210. Then, server 212 may optionally perform reconciliation (operation 230) with electronic device 210 to confirm that the user is also associated with the existing identifier.

In some embodiments of method 100 (FIGS. 1 and 2), there may be additional or fewer operations. Moreover, the order of the operations may be changed, and/or two or more operations may be combined into a single operation.

In an exemplary embodiment, the enrollment technique enhances the customer or user experience by allowing the user to reconcile their identity (for example, login information) during the enrollment process if it is 'valuable.' A valuable identity is one that contains or has associated data that can be used to assist the signup or enrollment process. If the user's current identity (i.e., the one provided in the enrollment process) does not provide value, then reconciling this login to the new product or service may happen after the user completes the enrollment process. In this way, the enrollment technique may increase the number of users that are converted to customers.

In particular, during the enrollment technique, a 'shadow' identity may be created that allows the user to have a duplicate username or login name to another one (and, more generally, to another identifier) that the user may already have for another service or product that is provided by the same provider as the provider of the service or product. This shadow identity may be specific to the product they are signing up for and, thus, may allow them to complete the enrollment process. Once the user has become a customer, the user may be encouraged or required to reconcile their shadow identity with their real one (i.e., the user may reconcile the identifier and the existing identifier). This approach may allow users to avoid remembering or using the existing identifier (such as existing login information) unless it is useful to the enrollment process, and may also allow the enrollment process to be simplified when possible.

For example, a user may sign up for online accounting software, which results in the creation of a login/password (identifiers) in an identity of the user and a company account for their small business. Subsequently, the user may attempt to enroll in a mobile-payments application (for example, the user may click on a link to a sign-up web page). This sign-up web page may request that the user enter their email address and their company name (as well as other profile information). After the user provides their email address, an identity mechanism may search for and find an existing identity with an associated existing identifier that matches the email address. In addition, the company name may be used to refine the list of potential matches. Then, if 24 of 28 fields of enrollment information associated with the mobile-payments application are the same as those for the online accounting software, only a subset of the questions or fields in the enrollment process (such as the remaining four fields) may be displayed. Moreover, after the enrollment process is completed, the user may be asked to reconcile their identities for the mobile-payments application and the online accounting software. If these identities are the same, they may be merged or collapsed into a single identity for both services or products.

Alternatively, after signing up for the online accounting software, the user may attempt to enroll in an online income-tax preparation service. On a sign-up web page, the user may be asked to enter their email address and their company name (as well as other profile information). After the user provides their email address, the identity mechanism may search for and find an existing identity with an associated existing identifier that matches the email address. However, it may be determined that the enrollment information associated with the existing identity may not help the enrollment process for the online income-tax preparation service (for example, a majority of the enrollment information for the two services or products may be different). In this case, the fill enrollment process for the online income-tax preparation service may be performed. This enrollment process may use a shadow identity. Subsequently (for example, after three uses or three days), when the user logs in to the online income-tax preparation service using the shadow identity, they may be asked to reconcile the shadow identity with the existing identity associated with the online accounting software. This reconciliation may result in the merging of the two identities and the associated identifiers.

Figure 3:
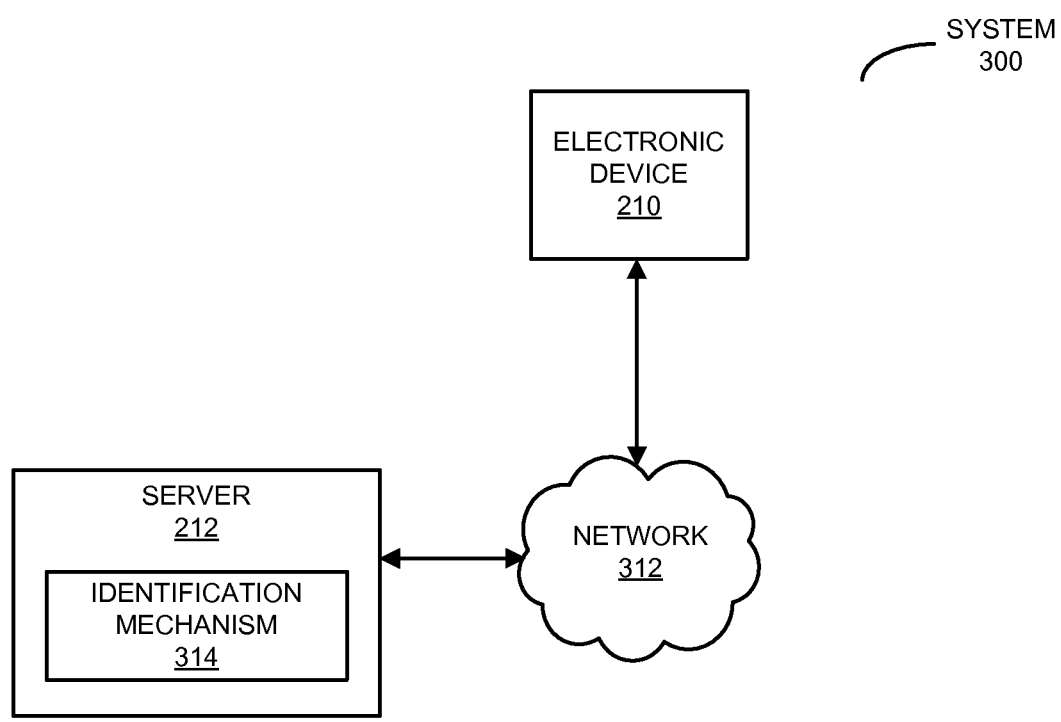
FIG. 3 is a block diagram illustrating a system that performs the method of FIGS. 1 and 2 in accordance with an embodiment of the present disclosure.

We now describe embodiments of a system and the computer system, and their use. FIG. 3 presents a block diagram illustrating a system 300 that can be used, in part, to perform operations in method 100 (FIGS. 1 and 2). In this system, during the enrollment technique a user of electronic device 210 may use a software product, such as a software application that is resident on and that executes on electronic device 210. (Alternatively, the user may interact with a web page that is provided by server 212 via network 312, and which is rendered by a web browser on electronic device 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on electronic device 210 (such as a software application that is provided by server 212 or that is installed and which executes on electronic device 210).

During the enrollment technique, a user of electronic device 210 may provide the enrollment request and the identifier via network 312. This information may be received by server 212. Then, server 212 may identify a match between the identifier and the existing identifier (for example, by using identification mechanism 314). Moreover, server 212 may determine if there is a correspondence between the service and the other service.

If there is a correspondence, server 212 may optionally perform reconciliation with electronic device 210 via network 312 to confirm that the user is also associated with the existing identifier. For example, the user may be asked if the two identifiers, identities and/or accounts are for the same user. After reconciliation, server 212 may use the enrollment information from the other service in an enrollment process for the service, and server 212 may perform a subset of the enrollment process with electronic device 210 via network 312.

Otherwise, server 212 may perform the full enrollment process with electronic device 210 via network 312. Then, server 212 may optionally perform reconciliation with electronic device 210 via network 312 to confirm that the user is also associated with the existing identifier.

Note that information in system 300 may be stored at one or more locations in system 300 (i.e., locally or remotely). Moreover, because this data may be sensitive in nature, it may be encrypted. For example, stored data and/or data communicated via network 312 may be encrypted.

Figure 4:
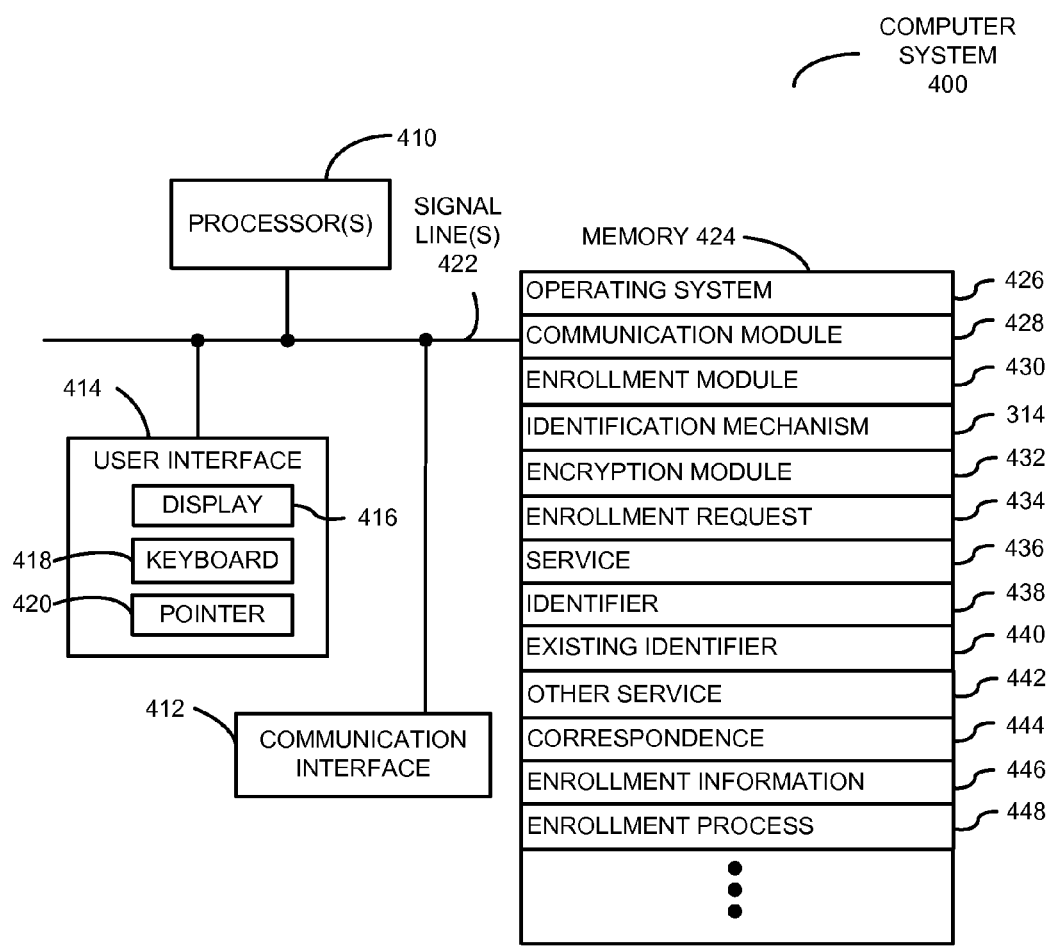
FIG. 4 is a block diagram illustrating a computer system that performs the method of FIGS. 1 and 2 in accordance with an embodiment of the present disclosure.

FIG. 4 presents a block diagram illustrating a computer system 400 that performs method 100 (FIGS. 1 and 2), such as server 212 (FIGS. 2 and 3). Computer system 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to computer system 400.

Memory 424 may also include multiple program modules (or sets of instructions), including: enrollment module 430 (or a set of instructions), identification module or mechanism 314 (or a set of instructions), and/or encryption module 432 (or a set of instructions). Note that one or more of these program modules (or sets of instructions) may constitute a computer-program mechanism.

During the enrollment technique, in response to enrollment request 434 for service 436, enrollment module 430 may request and receive identifier 438 from a user via communication module 428 and communication interface 412. Then, identification mechanism 314 may identify a match between identifier 438 and existing identifier 440 for other service 442. Moreover, identification mechanism 314 may determine correspondence 444 between service 436 and other service 442.

If there is a correspondence, enrollment module 430 may optionally perform reconciliation with the user via communication module 428 and communication interface 412 to confirm that the user is also associated with existing identifier 440. After reconciliation, enrollment module 430 may use enrollment information 446 from other service 442 in an enrollment process 448 for service 436, and enrollment module 430 may perform a subset of enrollment process 448 with the user via communication module 428 and communication interface 412.

Otherwise, enrollment module 430 may perform the full enrollment process 448 with the user. Then, enrollment module 430 may optionally perform reconciliation with the user to confirm that the user is also associated with existing identifier 440.

Because information used in the enrollment technique may be sensitive in nature, in some embodiments at least some of the data stored in memory 424 and/or at least some of the data communicated using communication module 428 is encrypted or decrypted using encryption module 432.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although computer system 400 is illustrated as having a number of discrete items, FIG. 4 is intended to be a functional description of the various features that may be present in computer system 400 rather than a structural schematic of the embodiments described herein. In some embodiments, some or all of the functionality of computer system 400 may be implemented in one or more application-specific integrated circuits (ASICs) and/or one or more digital signal processors (DSPs).

Computer system 400, as well as electronic devices, computers and servers in system 300 (FIG. 3), may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 312 (FIG. 3) may include: the Internet, World Wide Web (WWW), an intranet, a cellular-telephone network, LAN, WAN, MAN, or a combination of networks, or other technology enabling communication between computing systems.

Electronic device 210 (FIGS. 2 and 3), server 212 (FIGS. 2 and 3), system 300 (FIG. 3), and/or computer system 400 may include fewer components or additional components. Moreover, two or more components may be combined into a single component, and/or a position of one or more components may be changed. In some embodiments, the functionality of electronic device 210 (FIGS. 2 and 3), server 212 (FIGS. 2 and 3), system 300 (FIG. 3) and/or computer system 400 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments. Moreover, in the preceding discussion a 'subset' of the enrollment process should be understood to include some or all of the enrollment process.

While the preceding discussion used financial applications or software as illustrative examples, in other embodiments the enrollment technique may be used with a wide variety of additional types of data (including personal data in social networks) and/or software applications.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for enrolling an individual for a service that is provided to the individual in response to the individual accessing a first computer, the method comprising:

receiving an enrollment request for an enrollment process for the service, wherein the enrollment request includes an identifier associated with the individual;

using a computer, identifying a match between the identifier and an existing identifier associated with another service that is provided to the individual in response to the individual accessing a second computer;

determining if there is a correspondence between the service and the other, service by determining an overlap between enrollment information from the other service and enrollment information for the enrollment process for the service;

when there is a correspondence between the service and the other service, using the enrollment information from the other service in an enrollment process for the service, which allows a subset of the enrollment process to be performed; and otherwise, when there is not a correspondence between the service and the other service, performing the enrollment process for the service.

2. The method of claim 1, wherein the identifier includes an email address of the individual.

3. The method of claim 1, wherein the identifier includes a numerical identifier associated with the individual.

4. The method of claim 1, wherein the identifier includes a company associated with the individual.

5. The method of claim 1, wherein the correspondence between the service and the other service includes a match between more than a predetermined percentage of enrollment information for the service and the enrollment information for the other service.

6. The method of claim 1, wherein the correspondence between the service and the other service includes a predefined association of the service and the other service based on a common type of service.

7. The method of claim 1, wherein, before using the enrollment information from the other service in the enrollment process for the service, the method further comprises:

requesting confirmation that the existing identifier is also associated with the individual; and receiving the confirmation.

8. The method of claim 1, wherein, after performing the enrollment process for the service, the method further comprises:
   requesting confirmation that the existing identifier is also associated with the individual; and
   receiving the confirmation.

9. The method of claim 1, wherein receiving the enrollment request comprises receiving the enrollment request at a website for the service,
   wherein the identifier comprises data entered by the individual at the website,
   wherein the other service is accessed by using a second website that is separate and different from the website for the service,
   wherein requesting responses to the set of enrollment questions comprises presenting a web form at the website that includes a fillable field for each question in the set of enrollment questions, and
   wherein providing the responses to the enrollment questions not in the subset from the enrollment information from the other service comprises populating fillable fields in the web form for the enrollment questions not in the subset by using the enrollment information from the other service.

10. The method of claim 1, wherein performing the enrollment process comprises requesting responses to a set of enrollment questions from the individual, and wherein using the enrollment information from the other service in the enrollment process comprises requesting responses to only a subset of the enrollment questions from the individual and providing responses to the enrollment questions not in the subset from the enrollment information from the other service.

11. The method of claim 10, further comprising: when there is a correspondence between the service and the other service, displaying only the subset of the enrollment questions to the individual during the enrollment process for the service without displaying questions or fields for the enrollment questions not in the subset.

12. The method of claim 1, wherein the enrollment information from the other service comprises a first set of fields, wherein the enrollment information for the enrollment process comprises a second set of fields, and wherein determining the overlap comprises determining a number of fields in the first set that store information of the same type as fields in the second set.

13. The method of claim 1, wherein the identifier and the existing identifier are generated based on a hardware configuration of an electronic device for the individual and are not provided directly by the individual.

14. A computer-program product for use in conjunction with a computer system, the computer-program product comprising a non-transitory computer-readable storage medium and a computer-program mechanism embedded therein to facilitate enrollment of an individual with a service, the computer-program mechanism including instructions for:
   receiving an enrollment request for an enrollment process for the service, wherein the enrollment request includes an identifier associated with the individual;
   identifying a match between the identifier and an existing identifier associated with another service;
   determining if there is a correspondence between the service and the other service by determining an overlap between enrollment information from the other service and enrollment information for the enrollment process for the service;
   when there is a correspondence between the service and the other service, using the enrollment information from the other service in an enrollment process for the service, which allows a subset of the enrollment process to be performed; and
   otherwise, when there is not a correspondence between the service and the other service, performing the enrollment process for the service.

15. The computer-program product of claim 14, wherein the correspondence between the service and the other service includes a match between more than a predetermined percentage of enrollment information for the service and the enrollment information for the other service.

16. The computer-program product of claim 14, wherein the correspondence between the service and the other service includes a predefined association of the service and the other service based on a common type of service.

17. The computer-program product of claim 14, wherein, before the instructions for using the enrollment information from the other service in the enrollment process for the service, the computer-program mechanism further comprises:
   instructions for requesting confirmation that the existing identifier is also associated with the individual; and
   instructions for receiving the confirmation.

18. The computer-program product of claim 14, wherein, after the instructions for performing the enrollment process for the service, the computer-program mechanism further comprises:
   instructions for requesting confirmation that the existing identifier is also associated with the individual; and
   instructions for receiving the confirmation.

19. A computer system, comprising:
   a processor;
   memory; and
   a program module, wherein the program module is stored in the memory and configurable to be executed by the processor to facilitate enrollment of an individual with a service, the program module including instructions for:
      receiving an enrollment request for an enrollment process for the service, wherein the enrollment request includes an identifier associated with the individual;
      identifying a match between the identifier and an existing identifier associated with another service;
      determining if there is a correspondence between the service and the other service by determining an overlap between enrollment information from the other service and enrollment information for the enrollment process for the service;
      when there is a correspondence between the service and the other service, using the enrollment information from the other service in an enrollment process for the service, which allows a subset of the enrollment process to be performed; and
      otherwise, when there is not a correspondence between the service and the other service, performing the enrollment process for the service.

20. The computer system of claim 19, wherein, before the instructions for using the enrollment information from the other service in the enrollment process for the service, the program module further comprises:
   instructions for requesting confirmation that the existing identifier is also associated with the individual; and
   instructions for receiving the confirmation.

* * * * *